Nov. 23, 1965     W. LÄSSIG     3,219,470
HEAT SENSITIVE COPYING LAYERS
Filed Jan. 28, 1963
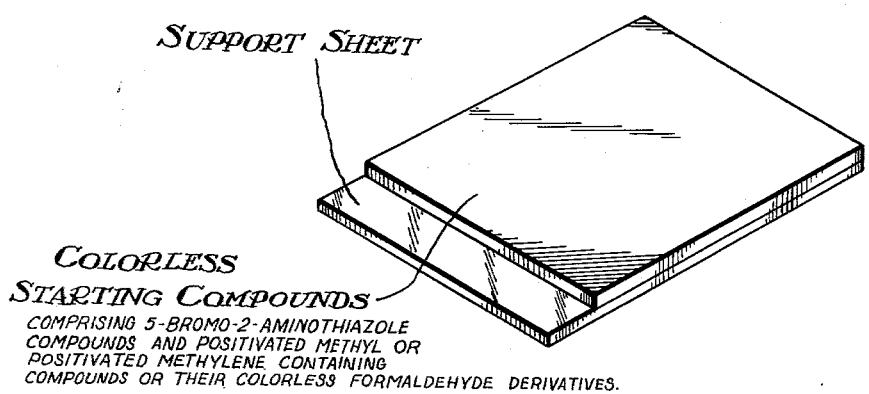
INVENTOR
WOLFGANG LÄSSIG
BY *Connolly and Hutz*
ATTORNEYS United States Patent Office 3,219,470
Patented Nov. 23, 1965

3,219,470
HEAT SENSITIVE COPYING LAYERS
Wolfgang Lässig, Cologne-Stammheim, Germany, assignor to Agfa Aktiengesellschaft, Leverkusen, Germany, a corporation of Germany
Filed Jan. 28, 1963, Ser. No. 254,488
Claims priority, application Germany, Feb. 13, 1962, A 39,475; Mar. 20, 1962, A 39,759; July 20, 1962, A 40,772
7 Claims. (Cl. 117—36.8)

The invention relates to a copying material in which the layers which are sensitive to heat rays contain the starting products for a chemical reaction which yields a coloured reaction product when subjected to heat.

Copying papers are known on which an image can be produced by infra-red radiation. These copying papers contain layers which undergo a colour change when heated either by absorption of the infra-red radiation or by transfer of the thermal energy by contact. To produce this effect, chemical substances which undergo a reaction or rearrangement with an assocaited colour change when heated above a critical temperature are added to the layers. In addition to this chemical method of producing an image, other methods based on physical principles are used. For example, an image may be produced by melting an opaque surface to render it transparent. In other processes, certain parts of the layer are imagewisely fixed under the influence of heat, while the parts of the layer not affected by the heat can be removed.

It is among the objects of the present invention to provide new systems of colourforming reactions having outstanding suitability for the application in heat-sensitive copying materials. Thus materials are provided which yield upon exposure to radiant heat coloured image of excellent quality.

I now have found that two reaction systems, both comprising 5-bromo-2-amino-thiazoles or derivatives thereof as reaction component, are excellently suitable for the production of coloured images in heat-sensitive copying materials.

The 5-bromo-2-amino-thiazole compounds suitable for the colourforming reaction according to the invention have the following general formula:

(I)
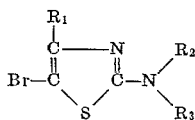

The said 5-bromo-2-amino-thiazole compounds can be incorporated into a sheet-like material in combination with a component containing a positivated methyl or methylene group, said component having the following general formula:

(II)    Y—CH$_2$—X

According to another embodiment of our invention those 5-bromo-2-amino-thiazole derivatives of the above general formula wherein R$_3$ is hydrogen are incorporated into the copying material in the form of their colourless reaction product with formaldehyde.

In the above general formulae R$_1$, R$_2$ and R$_3$ each represent hydrogen atoms or alkyl, aryl, aralkyl, cycloalkyl or heterocyclic groups. The organic radicals may in turn be substituted, for example by halogen atoms, such as chlorine, bromine, lower alkyl radicals having up to 5 carbon atoms or lower alkoxy groups. Y in the above formula represents (1) an amine or amide grouping of the general formula

wherein R$_4$ stands for an alkyl radical having up to 6 carbon atoms and aryl-, aralkyl- cycloalkyl-group, a heterocyclic radical or an aryl- or aliphatic-acyl-group; R$_5$ stands for a hydrogen atom or R$_4$;

(2) an organic sulphide group or a thiocarboxylic acid group of the following general formula

wherein R$_6$ stands for an alkyl group, having 8–20 carbon atoms and aryl-, aralkyl-, cycloalkyl-radical, a heterocyclic ring or an acyl or a thioacyl-group;

(3) a sulphonic acid ester grouping, having the formula

wherein R$_7$ represents an aryl radical and
(4) the grouping Z, wherein Z stands for a

grouping in which the symbol ($\delta^-$) indicates that the C-atom has a negative charge which is stronger than the negative charge of a methine ring member of an unsubstituted benzene ring. To this group belong methylene or methine groups in aromatic rings, the o- or p-position of which is substituted with amino- or hydroxy-groups, whereby it is understood that the term aromatic also includes heterocyclic rings. Further examples of Z are, e.g., the 3-position in indole, the 5-position in 2-amino thiazole and the like. As to the definition of Z we refer, for example, to Textbook of Organic Chemistry, e.g., "Lehrbuch der organischen Chemie" of Hans Beyer, published by S. Hirzel-Verlag, Leipzig, 1961, pages 372–377, "Organic Chemistry" of H. Gilman, 2d edition, vol. I, pages 174–213 in particular 203–213; vol. II pages 1975–1979, furthermore "Advanced Organic Chemistry" of L. F. Fieser, N.Y., Reinhold Publ. Co., 1961, pages 620–638. In the above Formula II, X stands for a member of the group consisting of hydrogen, aryl and Y.

The reaction components of Formula II are generally colourless or faintly coloured compounds at normal temperature. When heated above a temperature usually lying above the melting point of the thiazole compound, these substances react with one another to form di- or triarylmethane dyestuffs in which at least one and at the most two aryl radicals, depending on the nature of the reaction components X—CH$_2$—Y, is or are replaced by heterocyclic radicals, for example 2-amino-thiazolyl-(5), in accordance with the following equation:

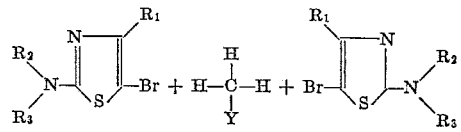

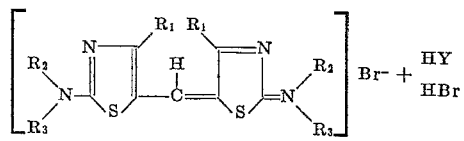

The above reaction may be started simply by heating the two reaction components which are embedded in a suitable binding agent on a suitable support. Temperatures of about 130 to 220° C. preferably 130–150° C. are required. The actual temperatures required in each case depend on the reaction components. Such temperatures may easily occur by infrared radiation.

The heat-sensitive reaction products of 5-bromo-2-amino-thiazoles with formaldehyde referred to above which can also be used according to the invention may be produced, for example, by reacting 2 mols of thiazole derivative with 1 mol formaldehyde in acetic acid solution in the presence of catalytic hydrogen ions. The products are colourless and in most cases crystallize well.

The chemical constitution of these compounds is not yet known but it may be assumed that they have one of the structures indicated by the following three general formulae:

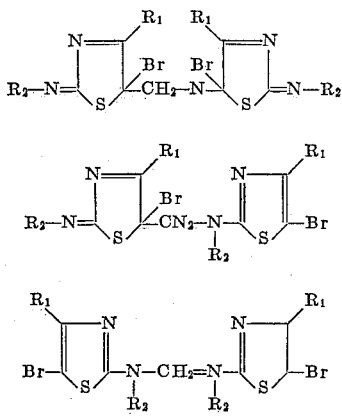

When these compounds are heated to temperatures above 100° C. preferably between 130 and 200° C., deeply coloured di-(2-amino-thiazolyl)-methane dyestuffs of the following general formula

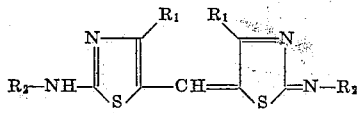

are produced.

The following 5-bromo-2-amino-thiazole according to Formula I are suitable for the process according to the invention:

5-bromo-2-amino-thiazole (J. P. English, J. Am. Soc. 68, 453
5-bromo-4-methyl-2-amino-thiazole
5-bromo-2-amino-4-phenyl-thiazole (E. Hoggarth J. Che.- Soc. (1947), 114
5-bromo-2-p-toluylamino-4-phenyl-thiazole (R. v. Walther, J. Prakt. Chem. 87, 27 (1913)
5-bromo-2-phenylamino-4-methyl-thiazole
5-bromo-2-methylamino-4-phenyl-thiazole
5-bromo-2-p-chlorophenylamino-4-phenyl-thiazole
5-bromo-2-methylamino-4-p-methoxyphenyl-thiazole
5-bromo-2-(4-phenylthiazolyl)amino-4-phenyl-thiazole
5-bromo-2-(diphenylamino)-4-phenyl-thiazole
5-bromo-2-naphthylamino-4-phenyl-thiazole
5-bromo-2-ethylamino-4-phenyl-thiazole
5-bromo-2-cyclohexylamino-4-phenyl-thiazole
5-bromo-2-ethylamino-4-cyclohexyl-thiazole
5-bromo-2-pyridinylamino-4-phenylthiazole
5-bromo-2-alkylamino-4-(1-phenyl-3-methylpyrazolinyl)-thiazole
5-bromo-2-phenylamino-4-thienyl-thiazole
5-bromo-2-phenylamino-4-thiazolyl-thiazole
5-bromo-2-phenylamino-4-pyridinyl-thiazole The thiazole derivatives listed above can be prepared by brominating 2-amino-thiazoles being unsubstituted in 5-position at approximately 20° C. in the presence of sodium acetate using as reaction medium a mixture of glacial acetic acid and chloroform. Thereafter the reaction mixture is diluted with water, the organic layer separated and evaporated, the resulting 5-bromo-2-amino-thiazoles can be recrystallized from lower aliphatic alcohols or glacial acetic acid.

Suitable for use as compounds which contain a reactive positive methyl or methylene group and which correspond to the Formula II are substances which contain a methyl or methylene group linked to substituents represented by X or Y. The influence of the hetero atoms oxygen, sulphur or nitrogen produces the $\delta^+$-character of the C-atom of the said methyl or methylene group, which character is necessary for the reaction. The same effects is obtained with group Z defined above which represents a strongly negative C-atom of an aromatic ring system, for example, a benzene or heterocyclic ring system.

The following compounds are, for example, suitable:

2-methylamino-4-phenyl-5-bromo-thiazole
N-dimethyl-benzamide
N-methyl-2-phenyl-indole
2-methylamino-4-methyl-thiazole
Dimethyl-formamide
Benzylaniline
Dibutyl methylamine
Hexyl-methyl-amine
Dimethyl-aniline
Dimethyl-amino-naphthaline
Benzyl-methyl-amine
Dicyclohexyl methyl amine
N-methyl barbituric acid
1,3-dimethylpyrazolone (5)
1,2-dimethyl benzimidazole
Phthalic acidmethyl-imide
N-methyl-acetamide
Nicotinic acid methyl amide
Toluene sulphonic-acid methyl amide
Sym. di-methyl urea
N-methyl benzoic acid amidine
Octyl methyl sulphide
p-Chloro thioanisole
Methyl 1-naphthyl thioether
Methyl benzyl sulphide
Dibenzyl sulphide
Methyl 2-benzthiazolyl thioether
Methyl 5-(2-phenyl-1,3,4-thiodiazolyle)-thioether
Thiobenzoic acid methyl ester
Isopropyl methyl dithiocarbonic acid ester
Dithiobenzoic acid methyl ester
p-Methoxyphenyl methylthioether
Toluene-sulphonic-acid-methyl-ether
2-phenylamino-4-phenyl-5-methylthiazole
5-benzyl-2-amino-4-phenyl-thiazole
5-methyl-2-amino-4-phenyl-thiazole
5-methyl-2-hydroxy-4-phenyl-thiazole
4-hydroxy,3-5-dibromotoluene
4-amino,3,5-dibromotoluene
3-methyl,2-phenylindole
3-benzyl-2-phenylindole
2,4-dimethyl-3,5-dicarbethoxy-pyrrole
1-phenyl-3,4-dimethyl-pyrazolone (5)
4,4'-bis-dimethylamino-diphenyl-methane
5,5'-bis-(2-amino-4-phenyl-thiazolyl)-methane Mannich bases such as:
2-phenyl-3-N-piperidinomethyl-indole
2-N-piperidino-methyl-naphthol-(1)
2-phenylamino-4-phenyl-5-(N-piperidinomethyl)-thiazole
2-phenylamino-4-phenyl-5-benzylthiazole According to a preferred embodiment the same chemical substance is used as the 5-bromo-2-aminothiazole and the compound containing the positive methyl group. This simplifies both the preparation and the working up of the heat-sensitive materials. Examples of 5-bromo-2-amino-thiazoles which react with each other to form coloured compounds include 5-bromo-2-methylamino-4-phenylthiazole, 5 - bromo - 2 - methylamino - 4 - p - methoxy-phenyl - thiazole and 5 - bromo - 2 - p - methylamino-phenyl-aminothiazole.

Both reaction components must have a relatively low vapour pressure at the temperature at which the copying process is carried out, i.e, the reaction components must be selected so that they do not evaporate from the layer at the temperature used for working up the product.

The material according to the invention is prepared as follows: A 5-bromo-2-amino-thiazole, together with a compound of the general Formula II is embedded in a binding agent and applied as a layer onto a carrier material. Suitable binding agents are natural colloids and synthetic film-forming materials that can be poured from their solvents, e.g. gelatine, polyvinylalcohol, cellulose derivatives (such as esters or ethers) polycarbonates, especially those based on dihydroxyphenyl alkanes, polyesters based on ethylene glycol and terephthalic acid, polyamides, polyurethanes and copolymers of olefinically unsaturated monomers such as vinyl chloride, vinyl acetate, styrene, acrylic acid and its derivatives and maleic acid and its derivatives.

One embodiment of the dry photographic material according to the invention is illustrated in the drawing. As can be seen therein the support layer carries a layer which contains the starting materials of the present invention. Upon application of heat the starting materials react forming the desired coloured dyestuff.

Paper is preferably used as support, but thin foils of the above mentioned synthetic materials are also suitable. When thin foils of synthetic material are used, the heat-sensitive substances may be embedded in the support itself. The papers are produced in known manner by pouring over them suitable solutions which contain the heat-sensitive substances, either in solution or in suspension. The formation of non-homogeneous layers, due to precipitation of the heat-sensitive compound or of the film-forming binding agent must be avoided.

Copying materials containing the reaction product of a 5-bromo-2-amino-thiazole with formaldehyde as the heat-sensitive compound are prepared accordingly.

To produce copies on the copying materials according to the invention, the copying paper or the like is placed in close contact with the original but with the side containing the copying layer away from the original, and briefly exposed to infra red radiation of high-intensity. The written areas of the original are thereby briefly heated in known manner and the heat is transferred by conduction to the heat sensitive layer where a colour reaction is started. However, this is only one of several possible methods. Other copying methods may be used for the copying layers according to the invention, for example, the copying layers may be illuminated through a transparent original, in which case the heat sensitive layer is pressed against a dark foil which absorbs heat rays. Furthermore, the image may, of course, be produced by hand by treating the copying layer with a suitably heated drawing instrument, stamp or the like.

*Example 1*

A solution of 5 g. of a polyvinyl acetal and
4 g. of 2-methylamino-4-phenyl-5-bromothiazole in 100 ml. of methanol is cast on to a thin writing paper. The resulting heat-sensitive layer is spontaneously coloured violet when heated above 135° C.

To produce the image, the paper is treated with a stamp heated to about 150° C. or processed in known manner in a so-called hot copying apparatus where it is briefly exposed to infra-red radiation, which briefly heats the image areas of the original. The heat-sensitive copying paper in contact with the original takes up this heat and so forms the image. If the heat-sensitive paper is placed on the original with the heat-sensitive layer away from the original, a non-reversed copy of the original is obtained.

*Example 2*

The process is carried out as in Example 1, except that the paper is covered with a solution of 5 g. of a polyvinyl pyrrolidone and
4 g. of 2-methylamino-4-phenyl-5-bromothiazole in 100 ml. of methanol.

The copying paper so obtained is coloured violet when heated above 135° C.

*Example 3*

The process is carried out as in Example 1 except that the paper is covered with a solution of 5 g. of a polycarbonate based on dihydroxyphenylalkanes (as described, for example, in the British specifications 808,629 or 853,587) and
4 g. of 2-methylamino-4-phenyl-5-bromothiazole in 100 ml. of ethyl acetate.

The copying paper so obtained is coloured violet when heated above 135° C.

*Example 4*

The process is carried out as in Example 1 except that the paper is covered with a solution of 5 g. of a polyvinyl chloride
4 g. of 2-ethylamino-4-phenyl-5-bromothiazole and
2 g. of N,N-dimethyl-benzamide in
80 ml. of benzene and
20 ml. of acetone.

The copying paper so obtained is coloured violet when heated above 135° C.

*Example 5*

The process is carried out as in Example 1 except that the paper is covered with a solution of 5 g. of a polycarbonate referred to in Example 3
4 g. of 2-ethylamino-4-phenyl-5-bromothiazole and
2 g. of N-methyl-2-phenyl-indole in
100 ml. of acetic ester The copying paper so obtained is coloured violet when heated above 135° C.

*Example 6*

The process is carried out as in Example 1 except that the paper is covered with a solution of 5 g. of a polyvinyl chloride
4 g. of 2-phenylamino-4-phenyl-5-bromothiazole and
2 g. of 2-phenylamino-4-phenyl-5-methylthiazole in
80 ml. of benzene and
20 ml. of acetone.

The copying paper so obtained is coloured blue when heated above 135° C.

*Example 7*

The process is carried out as in Example 1 except that the paper is covered with a solution of 5 g. of a polyvinyl chloride
4 g. of 2-phenylamino-4-methyl-5-bromothiazole and
2 g. of 2-phenylamino-4-phenyl-5-methylthiazole in
80 ml. of benzene and
20 ml. of acetone The copying paper so obtained is coloured brown-green when heated above 135° C.

*Example 8*

The process is carried out as in Example 1 except that the paper is covered with a solution of 5 g. of a polyvinyl chloride
4 g. of 2-p-chlorophenylamino-4-phenyl-5-bromothiazole
2 g. of 2-phenylamino-4-phenyl-5-methylthiazole in
80 ml. of benzene and
20 ml. of acetone.

The copying paper so obtained is coloured dark blue when heated above 135° C.

*Example 9*

The process is carried out as in Example 1 except that the paper is covered with a solution of 5 g. of a polyvinyl chloride
4 g. of 2-p-chlorophenylamino-4-phenyl-5-bromothiazole and
2 g. of 2-methylamino-4-methylthiazole in
80 ml. of benzene and
20 ml. of acetone.

The copying paper so obtained is coloured blue when heated above 135° C.

*Example 10*

The process is carried out as in Example 1 except that the paper is covered with a solution of 5 g. of a polyvinyl chloride
4 g. of 2-p-toluylamino-4-phenyl-5-bromothiazole and
2 g. of N,N-dimethyl-benzamide in
80 ml. of benzene and
20 ml. of acetone.

The copying paper so obtained is coloured green when heated above 135° C.

*Example 11*

The process is carried out as in Example 1 except that the paper is covered with a solution of 5 g. of a polyvinyl chloride
4 g. of 2-methylamino-4-p-methoxyphenyl-5-bromothiazole in
80 ml. of benzene and
20 ml. of acetone.

The copying paper so obtained is coloured blue when heated above 135° C.

*Example 12*

The process is carried out as in Example 1 except that the paper is covered with a solution of 5 g. of a polyvinyl chloride
4 g. of 2-diphenylamino-4-phenyl-5-bromothiazole and
2 g. of N,N-dimethyl-benzamide in
80 ml. of benzene and
20 ml. of acetone.

The copying paper so obtained is coloured brown when heated above 135° C.

*Example 13*

The process is carried out as in Example 1 except that the paper is covered with a solution of 5 g. of a polyvinyl chloride
4 g. of 2-naphthylamino-4-phenyl-5-bromothiazole and
2 g. of N,N-dimethyl-benzamide in
80 ml. of benzene and
20 ml. of acetone.

The copying paper so obtained is coloured olive green when heated above 135° C.

*Example 14*

The process is carried out as in Example 1 except that the paper is covered with a solution of 5 g. of a polyinvyl chloride and
4 g. of 2-methylamino-4-naphthyl-5-bromothiazole in
80 ml. of benzene and
20 ml. of acetone.

The copying paper so obtained is coloured violet when heated above 135° C.

*Example 15*

A solution of 5 g. of a polyvinyl acetal
1.5 g. of methylene-bis(di-n-butylamine) and
2 g. of 5-bromo-2-p-chlorophenylamino-4-phenyl-thiazole in
100 ml. of ethanol is cast onto a thin writing paper.

The resulting heat-sensitive layer is spontaneously coloured blue green upon heating above 135° C.

To produce the image, the paper is either treated with a writing or stamping instrument which is heated to about 150° C. or processed in known manner in so-called hot copying apparatus where it is subjected to infra red radiation for a short period, which causes brief heating of the areas on the original corresponding to the image. The heat-sensitive copying paper which is in contact with the original absorbs this heat and thus makes a copy of the original. If the heat-sensitive paper is placed on the original with the heat-sensitive layer away from the original, then a laterally non-reversed copy is obtained.

*Example 16*

The process is carried out as in Example 15 except that the paper is coated with a solution of 5 g. of a polyvinyl acetal
1.5 g. of 2-piperidinomethyl-naphthol-1 and
2 g. of 5-bromo-2-p-chlorophenylamino-4-phenyl-thiazole in
100 ml. of ethanol.

The resulting copying paper is coloured blue black when heated above 135° C.

*Example 17*

The process is carried out as in Example 15 except that the paper is covered with a solution of 5 g. of a polyvinyl acetal
1.5 g. of 2-phenyl-3-benzylindole and
2 g. of 5-bromo-2-p-chlorophenylamino-4-phenyl-thiazole in
100 ml. methanol.

The copying paper so obtained is coloured blue green when heated above 135° C.

*Example 18*

The process is carried out as in Example 15 except that a solution of 5 g. of a polyvinyl acetal
1 g. of bis-p-dimethylaminophenyl-methane and
1.5 g. of 5-bromo-2-p-chlorophenylamino - 4 - phenyl-thiazole in
100 ml. of methanol is used.

The copying paper so obtained is coloured blue green when heated above 135° C.

*Example 19*

The process is carried out as in Example 1 except that the paper is covered with a solution of 5 g. of polyvinyl chloride
1.5 g. of 2-p-chlorophenylamino-4-phenyl-5-N-piperidinomethylthiazole and
2 g. of 5-bromo-2-p-chlorophenylamino-4-phenyl-thiazole in
80 ml. of benzene and
20 ml. of acetone.

The copying paper so obtained is coloured blue green when heated above 135° C.

Example 20

The process is carried out as in Example 15 except that the paper is covered with a solution of 5 g. of polyvinyl chloride
2 g. of 2-benzylamino-4-phenyl-5-bromo-thiazole in
80 ml. of benzene and
20 ml. of acetone.

The copying paper so obtained is coloured blue green when heated above 135° C.

Example 21

The process is carried out as in Example 15 except that the paper is covered with a solution of 5 g. of polyvinyl chloride
1 g. of dibenzylsulphide and
2 g. of 2-p-toluyl-amino-4-phenyl-5-bromothiazole in
80 ml. of benzene and
20 ml. of acetone.

The copying paper so obtained is coloured blue green when heated above 135° C.

Example 22

The process is carried out as in Example 15 except that the paper is covered with a solution of 5 g. of cellulose acetate
1.5 g. of dibenzylsulphide and
2 g. of 2-methylamino-4-phenyl-5-bromo-thiazole in
100 ml. of acetone.

The copying paper so obtained is coloured red brown when heated above 135° C.

Example 23

The process is carried out as in Example 15 except that the paper is covered with a solution of 5 g. of cellulose acetate
1.5 g. of 2-piperidinomethyl-naphthol-1 and
2 g. of 2-methylamino-4-phenyl-5-bromo-thiazole in
100 ml. of acetone.

The copying paper so obtained is coloured violet when heated above 135° C.

Example 24

The process is carried out as in Example 15 except that the paper is covered with a solution of 5 g. of cellulose acetate
1.5 g. of 2-phenylamino-4-phenyl-5-benzyl-thiazole and
2 g. of 2-methylamino-4-phenyl-5-bromothiazole in
100 ml. of acetone.

The copying paper so obfitained is coloured blue when heated above 135° C.

Example 25

The process is carried out as in Example 15 except that the paper is covered with a solution of 5 g. of cellulose acetate
1.5 g. of 2-p-chlorophenyl-4-phenyl-2-piperidinomethyl-thiazole and
2 g. of 2-methylamino-4-phenyl-5-bromothiazole in
100 ml. of acetone.

The copying paper so obtained is coloured violet when heated above 135° C.

Example 26

The process is carried out as in Example 15 except that the paper is covered with a solution of 5 g. of cellulose acetate
1 g. of 2-amino-4-phenyl-5-benzyl-thiazole and
2 g. of 2-methylamino-4-phenyl-5-bromo-thiazole in
100 ml. of acetone.

The copying paper so obtained is coloured blue when heated above 135° C.

Example 27

Copying material containing the heat-sensitive reaction product of 2-methylamino-4-phenyl-5-bromothiazole and formaldehyde.

(A) *Preparation of the heat-sensitive compound*

13.5 g. of 2-methylamino-4-phenyl-5-bromothiazole (1/20 mol) are dissolved in 100 ml. glacial acetic acid and 1.5 ml. of 30% formation (1/40 mol) and a few drops of concentrated hydrochloric acid are added at 30° C. while stirring. After a short time, the di-methylene compound crystallizes out as colourless crystals. The crystals are separated by suction filtration, washed with methanol and recrystallized from pyridine.

Yield 77%, M.P. 147–150° C., decomposes into a dark red product. A dyestuff of the following formula is obtained from the said reaction product by the following method:

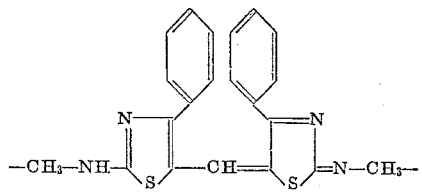

2.75 g. of the above product (1/200 mol) are mixed to a paste with 4 ml. dimethylformamide and rapidly heated to boiling point. The resulting deep violet solution is diluted with 20 ml. methanol and concentrated ammonia is added dropwise until the coloured base is precipitated. When recrystallized from pyridine, the dyestuff is obtained in the form of dark brown crystals with a yellow opalescence. Yield 72%, M.P. 224–225° C.

(B) *Preparation of the heat-sensitive copying material*

A solution of 200 mg. of the heat-sensitive reaction product described above in
5 ml. of chloroform and
10 ml. of 5% polycarbonate as described in Example 3 solution in acetic acid is cast on to a thin writing paper, so-called copy paper. The resulting heat-sensitive copying paper is coloured violet upon heating to temperature of above 135° C.

To produce an image, the paper is either treated with a writing instrument or stamp heated to about 150° C. or processed in known manner in so-called hot copying apparatuses where it is exposed through the original to be reproduced for a brief period to intense infra red light. If the heat-sensitive paper is applied to the original with the active layer turned away from the original a laterally non-reversed image is obtained.

Example 28

Copying material containing the heat-sensitive reaction product of 2-ethylamino-4-phenyl-5-bromothiazole.

(A) *Preparation of the heat-sensitive compound*

28 g. of 2-ethylamino-4-phenyl-5-bromothiazole (1/10 mol) are dissolved in 200 ml. of glacial acetic and treated at 30° C. with 5.5 ml. of 30% formalin (1/20 mol) and a few drops of concentrated hydrochloric acid while stirring. After a short time, the di-methylene compound crystallizes out as colourless crystals. The crystals are filtered by suction washed with methanol and recrystallized from pyridine.

Yield 50%, M.P. 119.5° C., decomposes to a dark red product.

A dyestuff of the following formula is obtained from the said reaction product by the following method:

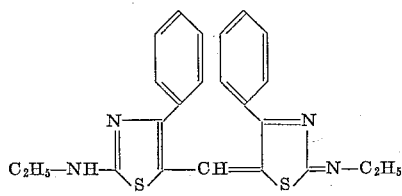

2.9 g. of the above product (1/200 mol) are mixed to a paste with 4 ml. dimethylformamide and rapidly heated to boiling point. The resulting deep violet solution is diluted with 20 ml. of methanol and concentrated ammonia is added dropwise until the coloured base is precipitated. When recrystallized from pyridine, the duestuff is obtained in the form of dark red crystals.

Yield 57%., M.P. 223° C.

(B) *Preparation of the heat-sensitive copying material*

The process is carried out as in Example 27 except that 200 mg. of the compound described above are used. The copying paper so obtained is also coloured violet when heated above 135° C.

*Example 29*

Copying material containing the heat-sensitive reaction product of 2-(p-chlorophenylamino)-4-phenyl-5-bromothiazole.

(A) *Preparation of the heat-sensitive compound*

7.3 g. of 2-(p-chlorophenylamino)-4-phenyl-5-bromothiazole (1/50 mol) are suspended in 100 ml. glacial acetic acid. After adding 1.1 ml. 30% formalin (1/100 mol) and 0.5 ml. concentrated hydrochloric acid, the reaction mixture is heated for 4 hours at 40° C. and kept stirred. The reaction components form thereby a blue coloured and a pulverulent mass is precipitated. After filtering the precipitate by suction it is recrystallized twice from pyridine with the addition of methanol.

Yield 60%, M.P. 267-268 with green coluration.

A dyestuff of the following formula is obtained from the said reaction product by the following method:

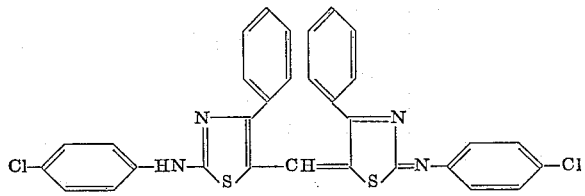

3.7 g. of the above compound (1/200 mol) are refluxed in 10 ml. of dimethylformamide for 5 minutes. The deep blue solution is taken up in 80 ml. of methanol. On trituration, the hydrobromide of the dyestuff crystallizes in the form of shiny crystals. The crystals are dissolved in pyridine and the dye base is precipitated with methanolic ammonia. Brownish red crystals of the above dyestuff are obtained from pyridine.

Yield 60%, M.P. 223-224° C.

3.7 g. of the above product (1/200 mol) are refluxed in 100 ml. glacial acetic acid after adding 1 mol. of 25% hydrobromic acid. The components are slowly dissolved. The solution becomes deep bluish violet and violet needle crystals are precipitated. After separating the crystals by suction filtration and working them up to obtain the base, the same dyestuff as described above.

Yield: 70%.

3.7 g. of the above compound (1/200 mol) are mixed 5 g. of phenol and rapidly heated to boiling. After the vigorous reaction has subsided, the dark blue solution is taken up in 30 ml. methanol. On trituration, the hydrobromide of the dyestuff crystallizes in the form of green opalescent platelets. After separation by suction filtration and working up the crystals to obtain the base, the same dyestuff is obtained.

Yield 35%.

(B) *Preparation of the heat-sensitive copying material*

The same process is carried out as in Example 27 except that 200 mg. of compound described above are used. The copying paper so obtained is coloured blue-green when heated above 130° C.

Similar results are obtained if the reaction product of 2-(p-bromo-phenylamino)-4-phenyl-5-bromothiazole is used. Said product is prepared as follows:

8.2 g. of 2-(p-bromo-phenylamino)-4-phenyl-5-bromothiazole (1/50 mol) are suspended in 60 ml. glacial acetic acid. A few drops of concentrated hydrochloric acid and 1.1 ml. 30% formalin (1/100 mol) are added and the mixture is then stirred for 3 hours at 40° C. At first, the components are dissolved forming thereby a dark blue solution. The precipitate which is formed after a short time is suction-filtered, washed with a small quantity of methanol and recrystallized from pyridine.

Yield 40% M.P. 288-289° C.

A dyestuff of the following formula is obtained from the said reaction product by the following method:

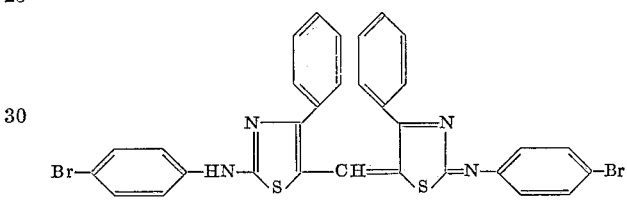

4.2 g. of the above compound (1/200 mol) are suspended in 100 ml. glacial acetic acid. After adding 1 ml. of 25% hydrobromic acid, the liquid is refluxed. The solution becomes deep blue and after a short time violet crystals separate. These are isolated by suction filtration and dissolved in pyridine. The base of the above dyestuff is precipitated in the form of brown red crystals with methanolic ammonia.

Yield 60%, M.P. 285-286° C.

*Example 30*

Copying material containing the heat-sensitive reaction product of 2-(p-methoxy-phenylamino)-4-phenyl-5-bromothiazole.

(A) *Preparation of the heat-sensitive compound*

3.5 g. of 2-(p-methoxy-phenylamino)-4-phenyl-5-bromothiazole (1/100 mol) are dissolved in 50 ml. glacial acetic acid. After adding 0.55 ml. 30% formalin (1/200 mol) and a few drops of concentrated hydrochloric acid, the mixture is stirred for a short time at about 40° C. The resulting precipitate in the form of colourless crystals are suction-filtered and recrystallized from pyridine by the addition of methanol.

Yield 70%, M.P. 158-159° C.

A dyestuff of the following formula is obtained from the said reaction product by the following method:

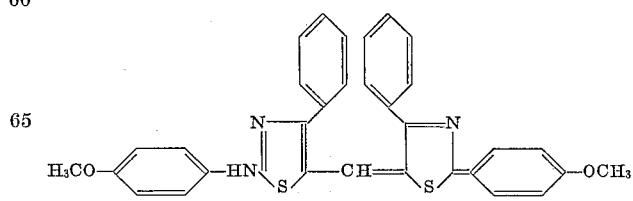

3.7 g. of the above compound (1/200 mol) are refluxed in 6 ml. of dimethylformamide for 2 minutes. The substance is taken up in 50 ml. of methanol and the base is precipitated in the form of small brown red crystals by adding ammonia drop by drop. The dyestuff is recrystallized from a mixture of pyridine and acetone.

Yield 43%, M.P. 247-248° C.

(B) *Preparation of the heat-sensitive copying material*

The same process is used as in Example 27 except that 200 mg. of the compound described above are used. The copying paper so obtained is coloured blue when heated above 130° C.

Similar results are obtained with the reaction product of 2-p-tolylamino-4-phenyl-5-bromothiazole. Said product is prepared as follows:

6.9 g. of 2 - p-tolylamino - 4 - phenyl-5-bromothiazole (1/50 mol) are dissolved in 100 ml. glacial acetic acid. 1.1 ml. 30% formalin (1/100 mol) and 0.5 ml. concentrated hydrochloric acid are then added and the solution is stirred for 2 hours at 40° C. A mass of crystals separate are isolated by suction filtration and washed with methanol and recrystallized from pyridine with the addition of methanol.

Yield 80%, M.P. 168° C. with decomposition.

A dyestuff of the following formula is obtained from the said reaction product by the following method:

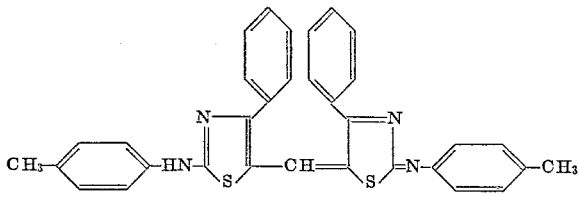

3.5 g. of the above product are mixed to a paste with 6 ml. of dimethylformamide and rapidly heated to boiling point. The solution develops a deep blue colour. When the substance is taken up in 50 ml. of methanol, a green opalescent crystalline mass precipitates, which is suction-filtered, dissolved in pyridine and the base is precipitated by adding ammonia drop by drop. The dyestuff is obtained in the form of brown red crystals.

Yield 35%, M.P. 256.5–257° C.

*Example 31*

Copying material containing the heat-sensitive reaction product of 2-(p-methoxyphenylamino)-4-methyl-5-bromothiazole.

(A) *Preparation of the heat-sensitive compound*

3 g. of 2-(p-methoxyphenylamino)-4-methyl-5-bromothiazole (1/100 mol) are dissolved in 20 ml. glacial acetic acid. After adding 0.5 ml. 30% formalin (1/100 mol) and a few drops of hydrochloric acid, the solution is stirred for 30 minutes at 40° C. The resulting precipitate is suction-filtered and recrystallized from pyridine with methanol.

Yield 80%, M.P. 156° C. with decomposition.

A dyestuff of the following formula is obtained from the said reaction product by the following method:

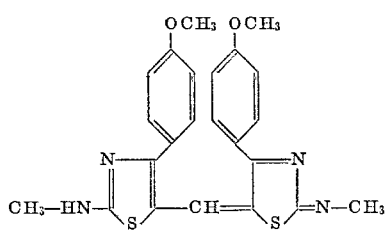

3 g. of the above compound (½₀₀ mol) are heated to boiling point in 6 ml. of dimethylformamide. The dark brown solution is taken up in 30 ml. methanol, and the dye base of the Formula VIIa is precipitated in the form of brown red crystals by adding ammonia. The dyestuff is recrystallized from dimethylformamide.

Yield 45%, M.P. 237–238.5° C.

(B) *Preparation of the heat-sensitive copying material*

The same process is carried out as in Example 27 except that 200 mg. of the compound described above are used. The copying paper so obtained is coloured violet when heated above 140° C.

I claim:

1. A dry heat sensitive copying material for the production of a coloured print-out image on exposure to radiant heat comprising a sheet-like material containing the colourless starting compounds for a colourforming chemical reaction being initiated by the imagewise application of heat, the said starting compounds having a boiling point of above 100° C., the said starting compounds being selected from the groups consisting of (A) (1) a 5-bromo-2-aminothiazole having the following general formula:

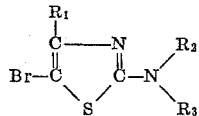

wherein $R_1$, $R_2$ and $R_3$ represent a radical selected from the class consisting of hydrogen, alkyl, aryl, aralkyl, cycloalkyl and heterocyclic groups, in combination with (2) a compound of the formula:

$$X-CH_2-Y$$

wherein Y represents groupings selected from those having the following general formulae:

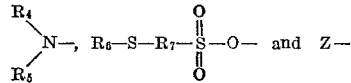

wherein $R_4$ stands for a radical selected from the class consisting of alkyl having up to 6 carbon atoms, aryl, aralkyl, cycloalkyl, heterocyclic groups, arylacyl and aliphatic acyl; $R_5$ stands for a member selected from the group consisting of hydrogen and $R_4$; $R_6$ stands for a member selected from the class consisting of alkyl having 8–20 carbon atoms, aryl, aralkyl, cycloalkyl, a heterocyclic ring, and acyl and a thioacyl group; $R_7$ represents an aryl radical and Z is a carbon atom, having a negative charge which is stronger than the negative charge of a methine ring member of an unsubstituted benzene ring, said carbon atom being a ring member of rings selected from the class consisting of aryl and heterocyclic rings; and wherein X stands for a member selected from the class consisting of hydrogen, aryl and Y; and (B) a colourless reaction product of the said 5-bromo-2-aminothiazole, wherein $R_3$ is hydrogen with formaldehyde.

2. A dry heat sensitive copying material according to claim 1, comprising a sheet-like support and a heat-sensitive layer containing the said starting compounds, embedded in a film-forming binding agent.

3. A dry heat sensitive copying material according to claim 1, containing as heat-sensitive starting compounds a 5-bromo-2-aminothiazole, having the following formula:

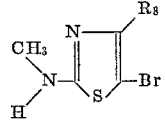

wherein $R_8$ represents a member selected from the class consisting of alkyl, aryl, aralkyl, cycloalkyl and a heterocyclic group.

4. A dry heat sensitive copying material according to claim 1, containing as heat-sensitive starting compounds a 5-bromo-2-aminothiazole, having the following formula:

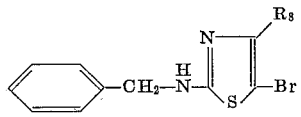

wherein $R_8$ represents a member selected from the class consisting of alkyl, aryl, aralkyl, cycloalkyl and a heterocyclic group.

5. A dry heat sensitive copying material according to claim 1 containing as heat-sensitive starting compounds colourless reaction products of formaldehyde and 5-bromo-2-aminothiazole wherein $R_1$ is phenyl and $R_3$ is hydrogen.

6. A dry heat sensitive material according to claim 1 containing as heat-sensitive starting compounds a 5-bromo-2-aminothiazole and a compound of the formula X—$CH_2$—Y wherein $R_1$ is phenyl, $R_3$ is hydrogen, Y is

$R_4$ is methyl, $R_5$ stands for aryl, and X is hydrogen.

7. A dry heat sensitive material according to claim 1 containing as heat-sensitive starting compounds a 5-bromo-2-aminothiazole and a compound of the formula X—$CH_2$—Y wherein $R_1$ is phenyl, $R_3$ is hydrogen, Y is

$R_4$ is methyl, $R_5$ stands for hydrogen and X is hydrogen.

References Cited by the Examiner
UNITED STATES PATENTS

| | | | |
|---|---|---|---|
| 2,457,078 | 12/1948 | Zienty et al. | 260—306.8 |
| 2,937,183 | 5/1960 | De Stevens et al. | 260—306.8 |
| 3,046,126 | 7/1962 | Sus et al. | 96—88 |
| 3,094,620 | 6/1963 | Reitter | 117—36.9 |
| 3,129,109 | 4/1964 | Workman | 117—36.8 |

WILLIAM D. MARTIN, *Primary Examiner.*

MURRAY KATZ, *Examiner.*